United States Patent [19]

Buchholz, Jr. et al.

[11] Patent Number: 5,728,185
[45] Date of Patent: Mar. 17, 1998

[54] CLOSED SYSTEM FOR VOLATILE ORGANIC COMPOUND RECYCLING

[76] Inventors: Le Roy H. Buchholz, Jr.; Loretta P. Buchholz, both of 3941 NW. 67th Pl., Gainesville, Fla. 32653

[21] Appl. No.: 718,256

[22] Filed: Sep. 20, 1996

Related U.S. Application Data

[62] Division of Ser. No. 412,478, Mar. 28, 1995, Pat. No. 5,618,333.

[51] Int. Cl.$^6$ .................................................. B01D 47/05
[52] U.S. Cl. ............................ 55/222; 55/267; 55/270; 55/275; 55/486; 55/DIG. 46; 118/326
[58] Field of Search .................... 55/267, 222, 274, 55/275, DIG. 46, 486, 528, 270; 95/237, 288; 454/54; 118/326

[56] References Cited

U.S. PATENT DOCUMENTS

| | | | |
|---|---|---|---|
| 4,261,707 | 4/1981 | Bradshaw et al. | 55/223 X |
| 4,351,863 | 9/1982 | Roesner | 427/421 |
| 4,444,573 | 4/1984 | Cosper et al. | 95/207 |
| 4,469,720 | 9/1984 | Morris | 427/345 |
| 4,537,120 | 8/1985 | Josefsson | 454/54 X |
| 4,620,858 | 11/1986 | Bradshaw et al. | 55/222 |
| 4,750,412 | 6/1988 | Itou | 118/326 X |
| 4,927,437 | 5/1990 | Richerson | 55/459.3 X |
| 5,165,969 | 11/1992 | Barlett et al. | 55/DIG. 46 |

FOREIGN PATENT DOCUMENTS

3907437   7/1989   Germany.

OTHER PUBLICATIONS

Takao, I., Patent Abstracts of Japan, JP 6007635, vol. 18, No. 204, Apr. 11, 1994.
Jiyouji, I., Patent Abstracts of Japan, JP 59199076, vol. 9, No. 66, Nov. 12, 1984.

*Primary Examiner*—Richard L. Chiesa
*Attorney, Agent, or Firm*—Saliwanchik, Lloyd & Saliwanchik

[57] ABSTRACT

In the system of the instant invention, volatile organic compounds (VOCs) liberated in the course of solvent-based painting of a workpiece, are recovered. The atmosphere within a closed spray-booth is maintained at a fixed humidity such that vaporized water, supplied in the form of steam or nebulized water vapor, acts as a carrier for VOCs liberated in the course of spray painting or heat curing of a workpiece. The VOCs may be recovered continuously, including during the spray-painting or heat curing of the workpiece. The VOC laden, humidified air is circulated through a condenser such that VOCs dissolved in the water vapor condense and are directed to a recovery means. The water and solvent are separated, recovered and purified for re-use or placed in an appropriate container for disposal, thereby eliminating the usual practice of expelling VOC laden air into the atmosphere. The system is provided with a flame-free heat source to cure the painted workpiece and to guard against the danger of explosion.

7 Claims, 4 Drawing Sheets

CLOSED SYSTEM FOR VOLATILE ORGANIC COMPOUND RECYCLING

This is a division of application Ser. No. 08/412,478, filed Mar. 28, 1995 and now U.S. Pat. No. 5,618,333.

BACKGROUND OF THE INVENTION

This invention concerns a method and system for recycling volatile organic compounds (VOCs) used in solvent-based paints. The system and method is applicable whenever a closed chamber or booth is used for spray-painting a workpiece, such as a car, to eliminate venting of VOCs to the atmosphere while capturing the VOCs for recycling.

Present day paint spray-booths need to be designed to provide a safe working environment, to prevent pollution of the atmosphere, and to enhance the quality of the product being sprayed. In general, paint spray-booths are equipped with a constant flow of air into and out of the spray-booth to maintain a reduced level of VOCs in the internal atmosphere. This arrangement has led to a number of attempts to reduce the level of VOCs in the exhaust air to minimize environmental pollution.

One such attempt involves the use of aqueous-based, rather than solvent-based paints. Such efforts have generally produced inferior paint results and excessively long periods for drying of the workpiece. Limiting the amount of VOCs in solvent based paints, as reported by at least one manufacturer, does help to reduce VOC emissions. However, substantial VOC emissions still occur when using such paints, and a more comprehensive solution is required.

Another attempt is found in U.S. Pat. No. 4,261,707, which discloses a complex process and system for elimination of paint solvent vapors from an automobile paint spray-booth and curing oven to maintain a healthful and clean environment for workers in the paint booth. The process and apparatus involves vacuum assisted vaporization of solvents from scrubber water for subsequent condensation and recovery of the solvent.

In U.S. Pat. No. 4,444,573, a method was disclosed for using a hydrotropic substance to decrease the level of an organic solvent in an air stream from a paint spray-booth. A hydrotrope is defined as a chemical substance which includes an organic group chemically bonded to a polar group. The function of the hydrotrope is to increase the solubility of a volatile solvent in water. The method involves (a) contacting of solvent laden air from a paint spray-booth with a spray of aqueous hydrotrope, (b) extracting solvent from the aqueous hydrotrope using an organic oil, and (c) stripping the solvent from the oil using a steam stripper followed by condensation and recovery of the solvent.

In U.S. Pat. No. 4,620,858, related to the 4,261,707 patent discussed above, a method and system is disclosed which achieves contact between solvent from paint spray and an organic solvent absorbing liquid, followed by regeneration of the solvent absorbing liquid. This contact is achieved in a chamber separate from the chamber in which the spraying operation is conducted.

In U.S. Pat. No. 4,927,437, a method and apparatus for removing particles, including solvent droplets, from moving air in a paint spray-booth. The apparatus involves a cyclonic separator.

In the instant invention, a closed system is provided such that, in general, air is not vented to the atmosphere during paint spray operation. Rather, a worker in the closed system is provided with an independent source of air, such as grade D fresh air supplied respirators, thus complying with health and safety requirements of the Occupational Safety and Health Administration (OSHA). The use of a supplied air respirator is already mandated by OSHA (29 CFR 1910.134d1). The instant system involves direct condensation of VOCs from the humidified paint booth atmosphere and direct condensation of solvent laden water vapor, rather than vacuum assisted vaporization and subsequent condensation. A controlled temperature and humidity environment for optimal painting conditions is thereby provided while at the same time reducing environmental pollution.

BRIEF SUMMARY OF THE INVENTION

In the method and system of the instant invention, volatile organic compounds (VOCs) liberated in the course of solvent-based painting of a workpiece, are recovered. The atmosphere within a closed spray-booth is controlled at a fixed humidity such that vaporized water, supplied in the form of steam, acts as a carrier for VOCs liberated in the course of spray painting or heat curing of a workpiece. The VOCs may be recovered continuously, including during the spray-painting or heat curing of the workpiece. The VOC laden, humidified air is circulated through a condenser such that VOCs dissolved in the water vapor condense and are directed to a recovery means. The water and solvent are separated, recovered and purified for re-use or placed in an appropriate container for disposal, thereby eliminating the usual practice of expelling VOC laden air into the atmosphere. The system is provided with a flame-free heat source to cure the painted workpiece and to guard against the danger of explosion.

Thus, it will be appreciated by those skilled in the art that the instant disclosure has several objects. One object is to provide a paint spray-booth having a controlled temperature and humidity so that those working in the field will no longer be at the mercy of the elements when it comes to spray-painting a workpiece under optimal conditions of temperature and humidity.

Another object of this invention is to provide a closed system paint spray-booth which substantially reduces emissions into the atmosphere of volatile organic compounds.

Another object of this invention is to provide a paint spray-booth which will enable those working in the field to comply with local, state and federal clean air directives while at the same time providing an efficient, cost-effective and safe working environment for those working in the spray paint industry.

Other objects and advantages of this invention will become apparent from the full disclosure which follows.

DETAILED DESCRIPTION OF THE PREFERRED EMBODIMENTS

This invention involves a closed system spray-booth which provides a thermostatically and humidistatically controlled environment for painting a workpiece and which recovers volatile organic solvents released into the air within the spray-booth during spray-painting and curing of a workpiece. The invention comprises a chamber within which a workpiece is spray-painted and cured, and at least one associated housing containing air treatment components. The chamber comprises:

(a) A sealable door through which a workpiece to be painted may be conveyed into and out of the chamber, a floor, a roof and walls;

(b) at least one sealable door through which a person who will spray-paint the workpiece may enter and leave the chamber;

(c) at least one source of supplied air for the person to use while present in the chamber;

(d) a means for circulating air within the closed system spray-booth such that the atmosphere within the booth is constantly recirculated between the chamber and the at least one housing containing air treatment components;

(e) a means for reducing or eliminating particulate matter from air as it passes from the chamber to the at least one housing containing air treatment components;

(f) a humidistat for measuring the level of humidity in the chamber at any given time, wherein the humidistat is operationally linked with a source of water vapor located in the at least one housing containing air treatment components such that when the humidity in the chamber falls below a pre-set limit, additional water vapor is added to the air entering the chamber.

The at least one housing containing air treatment components comprises:

(g) a solvent recovery unit which comprises a condenser and a means for directing condensate to a means for recovering the condensed solvent;

(h) a source of water vapor for maintaining the interior of the chamber in a humidified state; and (i) a thermostat regulated flame-free heat source to cure the painted workpiece.

Air is constantly recirculated between the chamber and the at least one housing containing air treatment components which maintain the temperature and humidity of the air within the chamber within pro-set limits. The air treatment components constantly remove volatile organic compounds released into the air during spray-painting and subsequent curing of the painted workpiece. Only one housing containing all of the air treatment components (g), (h), and (i) need be provided while a second housing may provide all of these elements or only element (i) to ensure even heating of the workpiece.

Figure 1:
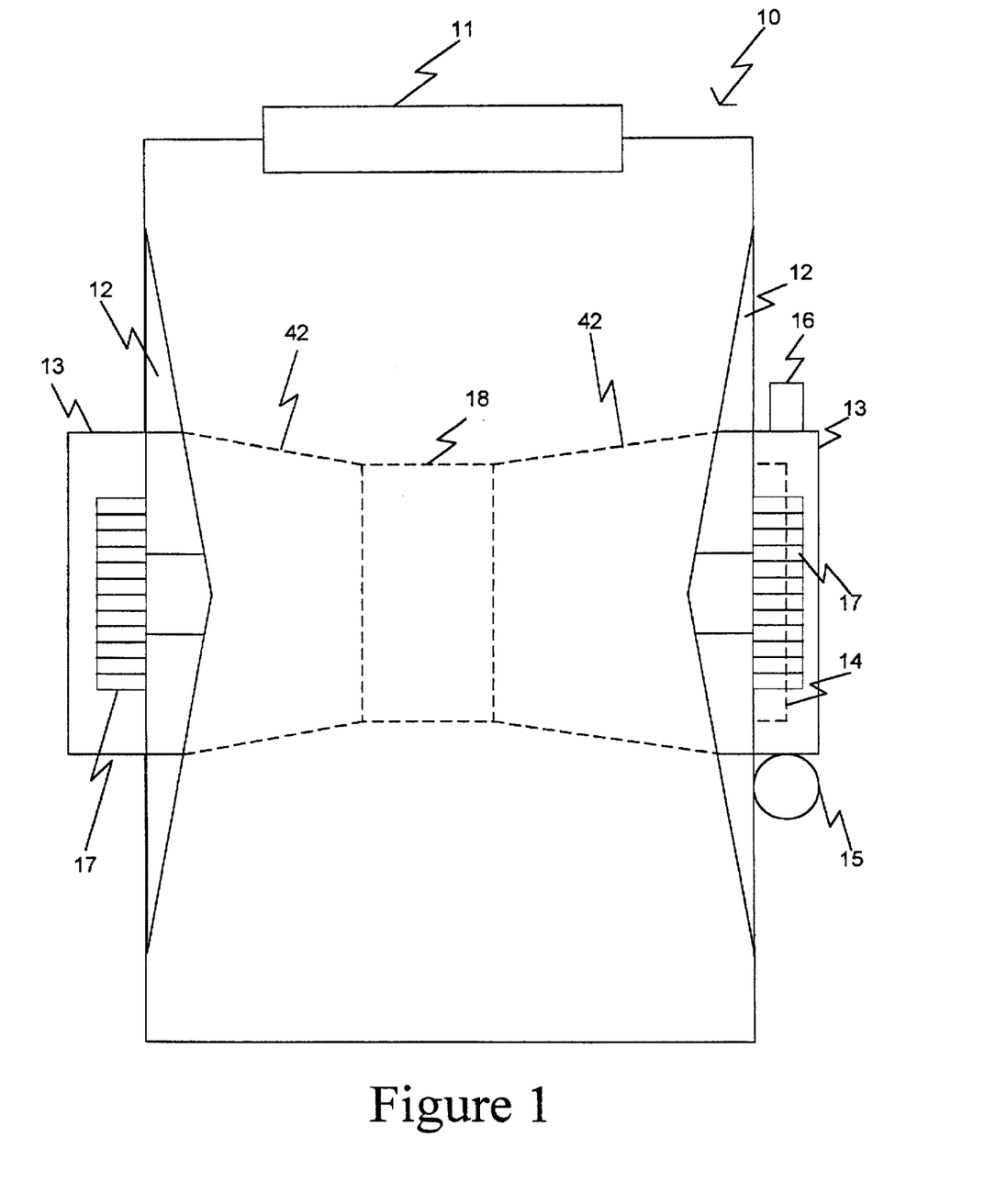
FIG. 1 is a top view of the paint spray-booth of this invention.

The operation of this system and its preferred embodiments may be best understood by referring now to FIG. 1. The paint spray-booth 10 of this invention is a sealed enclosure having four walls, a floor, a roof, at least one sealable door for a worker to enter and leave the booth, which may also be a double door with an interlock to minimize escape of internal air, and a sealable door 11 through which a workpiece to be painted is conveyed into the spray-booth. In operation, once the workpiece has been brought into the spray-booth 10, the door 11 is sealed and air recirculation within the booth is begun as described further below. Because the system is closed and fresh air from the outside is not supplied during operation, a person working in the booth must be equipped with a supplied air breathing system. Manufacturers of such units exist such that a variety of different units are available. For example, Martech Services Company produces a number of different supplied air breathing systems which comply with OSHA requirements and which supply grade D air to either one or several different supplied air respirators at the same time. Those units are equipped with alarm lights and audible horns. In addition, in using any such system in the spray-booth of the instant invention, in a preferred embodiment, an interlock may be provided such that unless the worker is using an operational supplied air respirator, the interlock prevents operation of the spray equipment such that no VOCs can be released into the work space until an appropriate breathing apparatus is employed.

The internal air is recirculated by positive pressure and thereby induced to pass through a filter system 12 and into a housing 13 which contains air treatment components and which forms a duct system. Once a worker begins spray-painting the workpiece, such as a passenger vehicle, a piece of furniture or any other workpiece which requires a VOC solvated paint, spray particles in the air are trapped on the filters which comprise the filter system 12. According to an alternate embodiment, the particles may be removed from the air by a conventional air scrubber which forms a water and paint emulsion. This is less preferred because a large volume of contaminated water is thereby produced which also contains dissolved VOCs. Once the particulates are removed from the air, the solvent-laden air passing into the housing 13 experiences a different set of conditions depending on which side of the spray-booth is being considered. As shown in FIG. 1, there is a different set of components on the left side as opposed to the right side. This is a matter of choice and economy, and those skilled in the art will appreciate that the booth could operate with identical components on both sides of the booth.

In the specific embodiment shown in FIG. 1, air passing through the filter system 12 on the right side of the booth first encounters condenser coils 14 which condense any humidity and VOCs dissolved in the water vapor as the air passes over the coils. The condensate drains from the condenser coils 14 to a storage and solvent recovery unit 15 which is described further below. The condensation coils 14 are part of a condenser unit which is conventional in the art of air-conditioning and therefore requires no further description here except to say that it is preferred that the coils be disposed at an angle so that as condensate collects on the coils, it runs down the coils and drips into a receptacle for conveyance to the storage and solvent recovery unit 15.

After dehumidification and removal of the VOCs entrained therein, the air is directed via the housing 13, which, as noted above, acts as a duct system for the air, into an area where a source of water vapor is added to the air by a humidistatically controlled water vapor generating device 16. Such devices are conventional in the art and need little further description here. Such devices as humidistatically controlled stem generators, sonic vapor generators or any like device which efficiently produces water vapor is acceptable. A commercially available humidistatically controlled steam generator is produced by AUTO-FLOW as a 1400 watt, 120 volt unit (model ESU-14) and as a 2000 watt, 220 volt unit (model ESU-20). Incorporation of such a device into the paint spray-booth of this invention is therefore contemplated. Preferably, the humidistat provides for precise control of the relative humidity within the booth. During the spray-paint operation, it is desirable to maintain a relative humidity in the range of about 45% to 55% relative humidity. This allows for optimal performance of the VOC based paints and provides sufficient humidity in the air to allow for efficient condensation and removal of dissolved VOCs. Those skilled in the art will appreciate that water additives may be included in the water, such as the hydrotropic substances described in U.S. Pat. No. 4,444,573, herein incorporated by reference for this purpose. During the drying cycle of the workpiece, when the temperature in the paint spray-booth is elevated to cure the paint (see further description below), it is desirable to maintain a relative humidity in the range of about 20% to 45%. Thus, it is desirable to equip the water vapor generating device 16 with a humidistat that may be easily set to maintain the humidity within either of these preferred operating relative humidity ranges. Control of the humidity and removal of the entrained VOCs has several additional advantages. Proper regulation of the humidity avoids dye-back, solvent popping and reduced lustre, which are all problems encountered in conventional paint spray-booths due to excessive humidity. In addition, proper regulation of the humidity increases the efficiency of the cure cycle such that less heat needs to be supplied. Thus, in a conventional paint spray-booth for automobiles, typically heat is supplied by a 1.5 million BTU direct fired gas furnace. In the instant invention, adequate heating may be achieved with a residential, oil-fired water heater (see further description below).

Once the air passes through the region in the housing 13 where water vapor is added, it is then forced into the a thermostatically controlled flame-free air-heating device 17. The device 17 may be any flame-free air heating device. However, since such devices were not readily commercially available, the instant disclosure provides for one such system which we installed for this purpose (see further description below). Air passing through the device 17 is heated to such an extent that the temperature within the paint spray-booth is maintained within desirable operating ranges both during the workpiece painting and curing cycles. During the painting cycle, the temperature is optimally maintained between about 60° F. and 90° F., and most preferably at about 85° F. During the curing cycle, the temperature is maintained at about 125° F. to about 145° F., and most preferably at about 135° F. to about 145° F. It is desirable that there be an air-heating unit on both sides of the paint spray-booth to maintain even heating of the workpiece, particularly during the curing cycle. As noted above, only one condenser and one source of water vapor need be used on one or the other side of the booth, although these elements may also be provided on both sides.

Once the heated air leaves the time-free air heating device 17, it is made to move into an air handling and fan assembly 18, mounted on top of the spray chamber, through a duct system 42. This assembly provides the source of positive pressure which causes the air trapped within the sealed paint spray-booth 10 to circulate through the filters and the other aforementioned components. The air, as it reaches the assembly, is in a heated and humidified state, having been stripped of VOCs. It is drawn back into the paint spray-booth to once again pick up VOCs as they are released during either the paint spray operation or the curing of the painted workpiece. For the purpose of the air handling system, a device such as a squirrel-cage fan operating at between about 9,000 to about 12,000 rpm is adequate. The lowest possible air movement that achieves efficient removal of overspray and circulation of VOC laden water vapor is preferably used to optimize even paint application. In the instant system, only one fan for recirculating the air is needed, as an exhaust fan which drives VOC laden air into the atmosphere is not required. All that is needed is about a half of one pound of positive pressure to be produced to efficiently recirculate the air to achieve about 9,000 to about 12,000 cu.ft/min. circulation (the internal dimensions of a typical automotive paint spray-booth are 23 ft by 14 ft by 9 ft=2898 cu.ft.).

The above mentioned filter system 12 is preferably composed of a plurality of high-efficiency replaceable filter units. In one embodiment of this invention, the filter units are preferably comprised of an expanded polystyrene "prefilter" and a woven DACRON filter. The polystyrene prefilter is used to trap the bulk of the paint particles as they are drawn into the filter system 12. The relatively particulate-free air is then drawn into the DACRON filter material to remove any residual particulates. This particular arrangement is preferred because the polystyrene material is relatively inexpensive and can be disposed as a small volume of hazardous waste upon "melting-down" with a small volume of lacquer or other available solvent.

Figure 2:
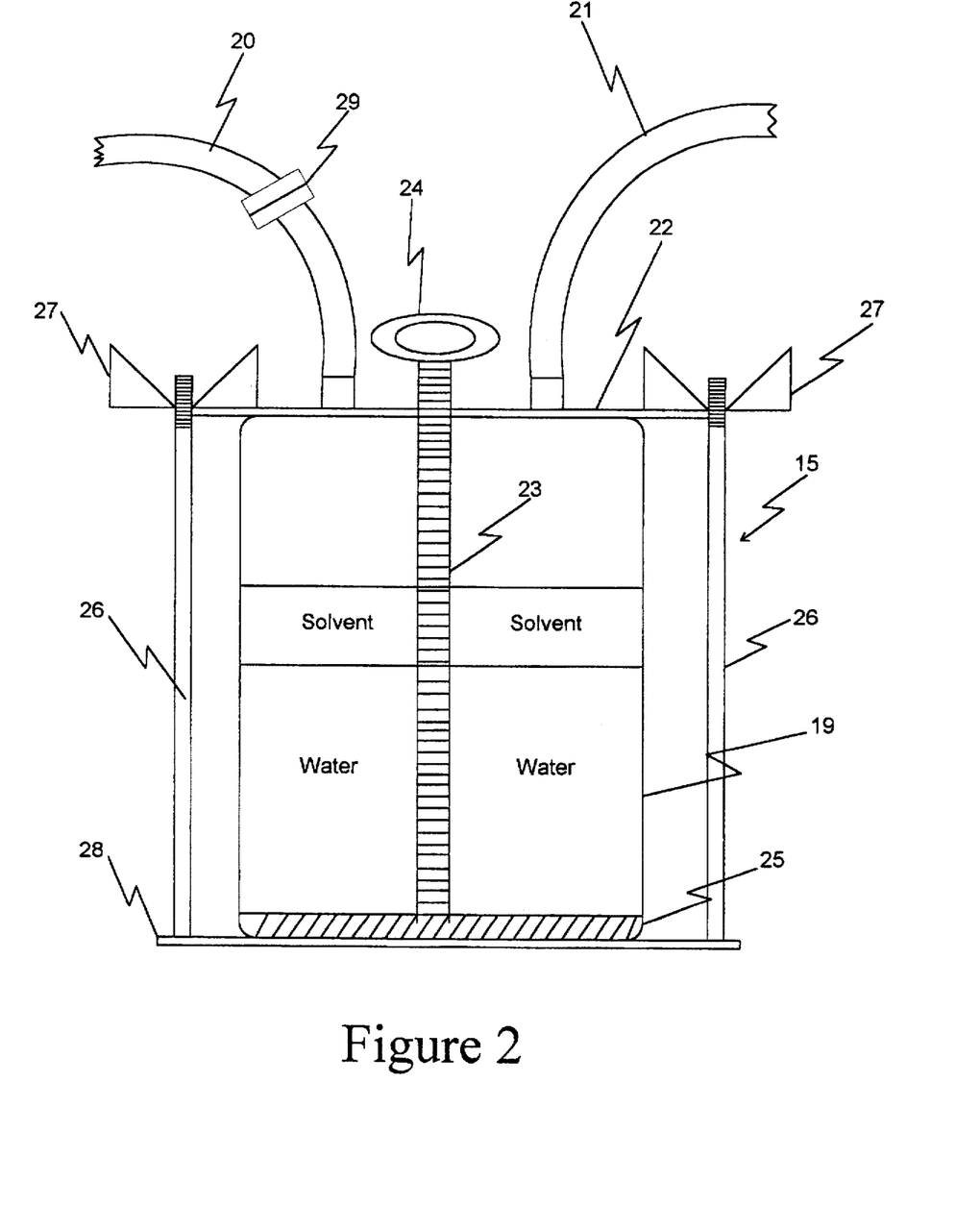
FIG. 2 is a schematic representation of the solvent recovery unit of this invention.

The solvent storage and recovery device 15 can be any sealed unit in which the various components of the condensate from the condenser 14 can be safely stored. In the instant invention, a particular storage chamber which also functions as a solvent recovery system has been devised and implemented. According to this embodiment of the invention, the solvent recovery device 15, which is shown in some detail in FIG. 2, comprises a cylinder 19 having a volume of about seven gallons, having a first inlet tube 20 which conveys condensate from the condenser 14 into the solvent recovery device 15, a second exit tube 21 which runs from the solvent recovery device 15 to a storage vessel. The cylinder 19 is provided with a sealed lid 22 through the center of which is a gasketed aperture through which a rod 23 is slidably fixed. At the top end of the rod 23 on the outside of the cylinder 19 is provided a handle 24. At the bottom end of the rod 23 is provided a gasketed plunger 25. In operation of this solvent recovery device, the plunger 25 is initially depressed to the bottom of the cylinder 19. As condensate enters the cylinder 19 through the first inlet tube 20, the cylinder begins to fill. All the while that the cylinder is filling with condensate, water and entrained solvent begin their natural process of separation, with the less dense solvent floating to the top. After the cylinder has become quite full, the plunger 25 is pulled up through the gasketed aperture in the lid 22 which forces solvent out of the second exit tube 21 to be collected in a storage vessel. According to this embodiment of the invention, it is desirable for the cylinder 19 to be a transparent, solvent resistant material such as glass. In this way, as the solvent water interface is brought to the top of the cylinder through the upward motion of the plunger 25, the process may be halted and the lower, water phase may be returned to the water vapor generating system 16 to be reused to trap additional VOCs. To provide for efficient sealing, bolts 26 are provided on either side of the cylinder with butterfly nuts 27 holding the lid down. The bottom ends of the bolts 26 are set in the base 28. To prevent backing up of solvent into the inlet tube, a closure device 29 is provided. Solvent recovered in this manner may be further purified in a conventional, commercially available solvent purification system such as that produced by Lenan Corporation under the trade name RECYCLIT, model SR-80 or like solvent recycling means.

Figure 3:
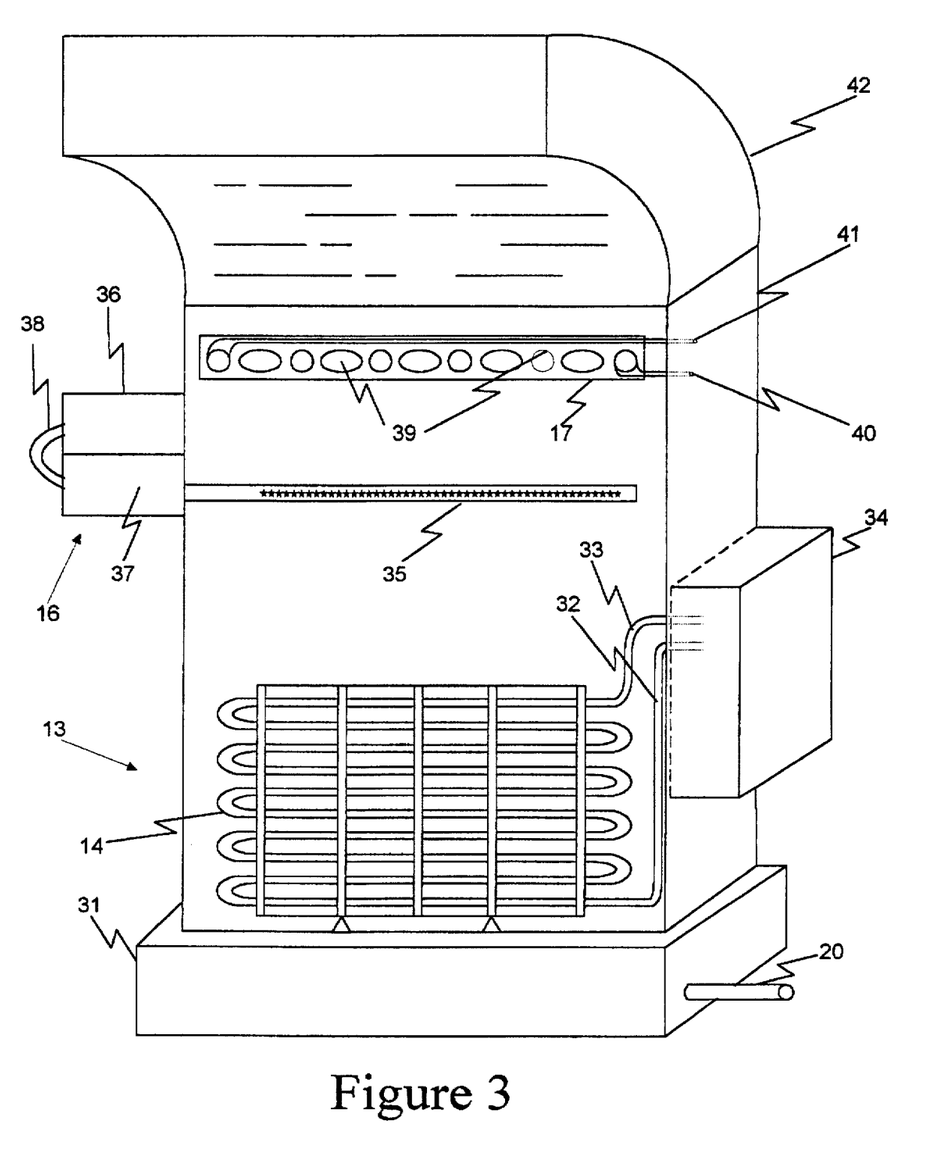
FIG. 3 is a schematic view of the housing containing air-treatment components as it would appear viewed through the wall of the paint spray-booth to which the housing is attached.
Figure 4:
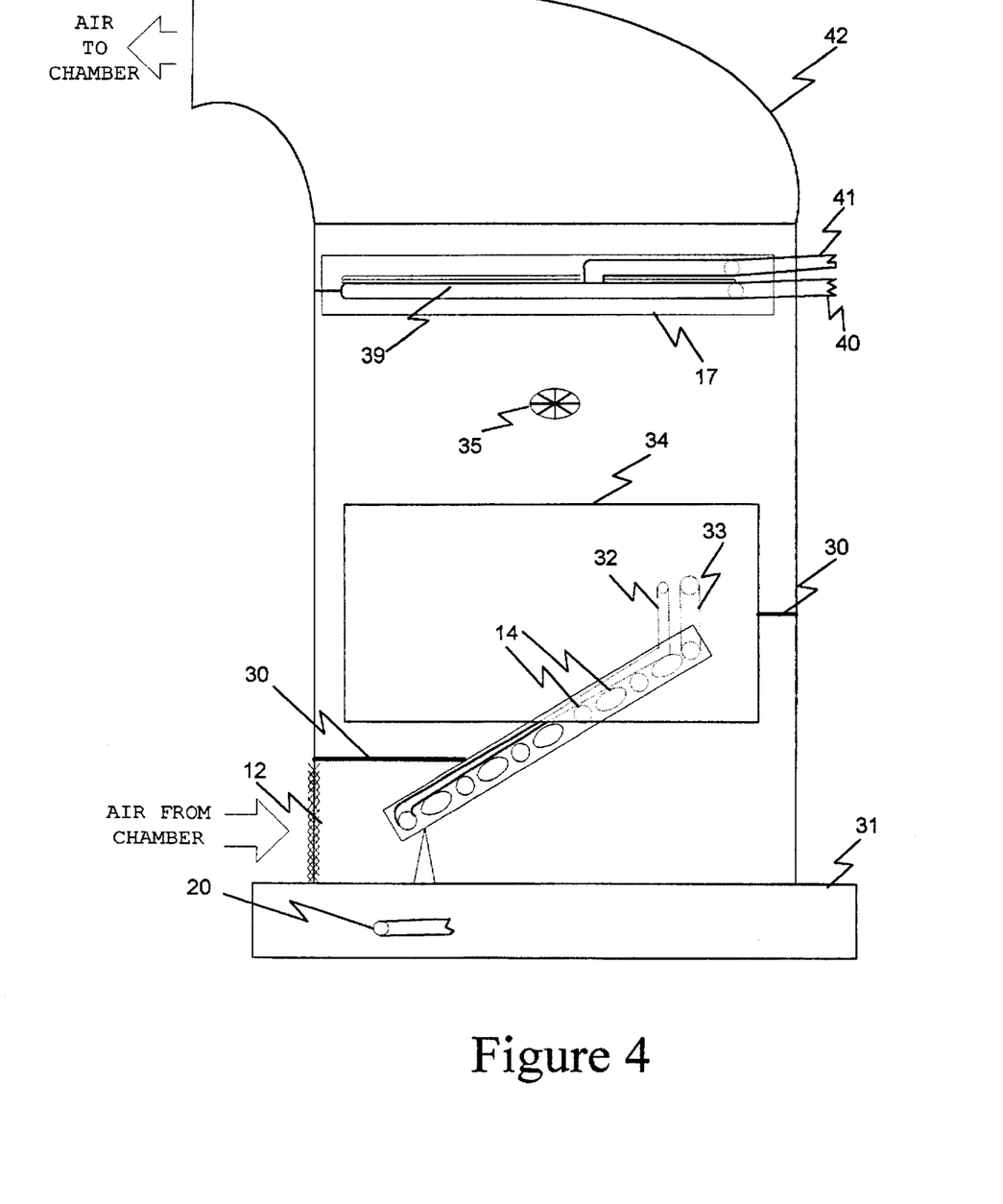
FIG. 4 is a side sectional view of the housing containing air-treatment components as it would appear viewed from the side of the paint spray-booth to which the housing is attached.

The disposition of several of the above mentioned air-treatment components within the housing 13 is shown in greater detail in FIGS. 3 and 4. These figures show air entering the housing through the filter system 12. The air is forced to move upward through the condenser 14 by the suction created by the fan assembly 18 and the seal created by baffles 30. As moisture containing VOCs condenses on the condenser 14, it drips into the reservoir 31, from which it is conducted via line 20 to the solvent recovery unit 15. Lines 32 and 33, for conveying coolant to and from a compressor 34 are shown.

Once beyond the condenser 14, the air passes a source of water vapor 16 which distributes the water vapor into the moving air via a steam wand 35 or like means. In one embodiment, the source of water vapor 16 is a steam generator having an upper fill compartment 36, which can receive water retrieved from the solvent recovery unit 15. The upper fill compartment 36 is connected to a lower, steam generator 37 via a hose 38. The steam generator 37 may, in addition, be equipped with a water line and a constant water level maintained by a float shutoff valve or electronically according to methods standard in the art. It will be appreciated by those skilled in the art that the steam generator may be, instead, a nebulizer or an ultrasonic generator for production and atomized water.

Once the air passes the water vapor generator 16, it passes thorough the flame-free air heating device 17, which may be comprised of a series of coils 39 through the inside of which heated liquid is passed from a remote liquid heating unit via inlet and exit pipes 40 and 41. Within the housing 13, as the recirculating air is passed through the heated coils, the humidified air becomes heated and enters the paint spray-booth as described above. In a particular embodiment of this invention, the liquid heating unit is a remote off-powered 185,000 BTU water heater. Use of an oil fired unit is advantageous as it allows for better per day calculations of fuel use, although other fuel sources such as natural gas, propane or wood could be employed in an appropriately adapted boiler. To the circulating water, an appropriate concentration of polyethylene glycol or like material is added to elevate the boiling point and depress the freezing point of the water. The liquid is heated to about 238° F. and then conveyed through insulated 1.25 inch copper pipes to the coils internal to the flame-free heating device 17 and from there, back to the remote heating unit. Once the air has passed through the flame-free heater 17, it is conducted back into the sealed chamber through duct work 42 which connects the housing with the chamber, via the fan assembly 18.

The housing 13, and indeed the entire booth 10, may be insulated with about 1.5 inch thick high-density foam, with an R rating of about 18 to reduce heat loss and thereby decrease the cost of heating.

It will be appreciated from the foregoing description of this invention that a novel, sealed paint spray-booth has been provided which substantially reduces the level of VOCs emitted into the atmosphere as a result of the use of solvent based spray paints. In addition, it will be appreciated that in a simple and cost effective fashion, a conventional paint spray-booth may be equipped with the various afore-described components so as to operate in an optimally thermostated and humidistated environment for optimal painting performance. Thus, both newly manufactured and retrofitted pre-manufactured or pre-fabricated paint booths comprising the elements herein described and claimed naturally come within the scope of this invention. While the invention has been described with respect to its preferred embodiments, and while specific details have been provided to enable those of ordinary skill in the art to comprehend the involved principles, it would be obvious to those skilled in the art from the foregoing disclosure that alternate embodiments may be operated in equivalent fashion to that described herein. Thus, the invention is not to be construed as being limited to the disclosed specifics herein. The invention as herein described is only limited by the appended claims and equivalents thereof.

REFERENCES

Bradshaw, Norman F., and Ivan Bloomer, U.S. Pat. No. 4,261,707, issued Apr. 14, 1981.
Cosper, David R., and Gretchen L. McKay, U.S. Pat. No. 4,444,573, issued Apr. 24, 1984.
Bradshaw, Norman F., and Ivan Bloomer, U.S. Pat. No. 4,620,858, issued Nov. 4, 1986.
Richerson, Ben M., U.S. Pat. No. 4,927,437, issued May 22, 1990.

We claim:

1. A closed system spray-booth which provides a thermostatically and humidistatically controlled environment for painting a workpiece and which recovers volatile organic solvents released into the air within the spray-booth during spray-painting of a workpiece, comprising a chamber within which a workpiece is spray-painted and cured, and at least one housing containing air treatment components, such that air can be constantly recirculated between the chamber and the housing containing air treatment components which maintain the temperature and humidity of the air within the chamber within pre-set limits and which constantly removes volatile organic compounds released into the air during spray-painting and subsequent curing of the painted workpiece, wherein said chamber comprises:
   (a) a sealable door through which a workpiece to be painted may be conveyed into and out of the chamber, a floor, a roof and walls;
   (b) at least one sealable door through which a person who will spray-paint the workpiece may enter and leave the chamber;
   (c) at least one source of supplied air for the person to use while present in the chamber;
   (d) a means for circulating air within the closed system spray-booth such that the atmosphere within the booth is constantly recirculated between the chamber and the at least one housing containing air treatment components;
   (e) a means for reducing or eliminating particulate matter from air as it passes from the chamber to the at least one housing containing air treatment components;
   (f) a humidistat for measuring the level of humidity in the chamber at any given time, wherein the humidistat is operationally linked with a source of water vapor located in the at least one housing containing air treatment components such that when the humidity in the chamber falls below a pre-set limit, additional water vapor is added to the air entering the chamber; and
wherein said at least one housing containing air treatment components comprises:
   (g) a solvent recovery unit which comprises a condenser and a means for directing condensate to a means for recovering the condensed solvent;
   (h) a source of water vapor for maintaining the interior of the chamber in a humidified state;
   (i) a thermostat regulated flame-free heat source to cure the painted workpiece; provided that only one housing containing all of the air treatment components (g), (h), and (i) need be provided while a second housing may provide all of these components or only component (i) to ensure even heating of the workpiece.

2. The closed system spray-booth of claim 1 wherein the system is equipped with an interlock that prevents operation of the paint spray when an operator is not equipped with a supplied air breathing system.

3. The closed system spray-booth of claim 2 wherein the supplied air breathing system provides continuously monitored breathable air of a predetermined grade.

4. The closed system spray-booth of claim 1 wherein the means for eliminating particulate matter from air comprises a scrubber or a filtration system having expanded polystyrene pre-filters and woven mesh filters.

5. The closed system spray-booth of claim 1 wherein the solvent recovery unit comprising a condenser and a means for recovering condensed solvent further comprises:

(a) a cylinder with a sealable lid;

(b) an inlet port through which condensate enters the cylinder;

(c) an exit port through which collected solvent is drawn for further processing;

(d) an aperture in the sealable lid through which is inserted a rod which at the bottom end, within the cylinder, is connected to a gasketed plunger and which at the top end, above the sealable lid, is a handle for pulling up or depressing the plunger; and (e) a stopper in the inlet port such that when the plunger is raised by pulling up on the handle, fluid can only leave the cylinder via the exit port.

6. The closed system spray-booth of claim 1 wherein the thermostat regulated flame-free heat source comprises:

(a) a boiler for the heating of a liquid;

(b) insulated pipes for conveying the heated liquid from the boiler to a circulation coil within the housing and from the circulation coil back to the boiler;

(c) circulation coils within the housing for heating air as it passes upward in the housing on its return to the paint spray-booth chamber; and (d) a thermostat located within the paint spray-booth chamber which may be set at desired temperatures such that the boiler is caused to turn on or off at preset limits to control the temperature within the paint spray-booth chamber.

7. The closed system paint spray-booth of claim 1 wherein the temperature is maintained between about 60° F. and 90° F. during the painting of a workpiece and between about 125° F. and 155° F. during the curing of a workpiece, while the relative humidity is maintained between about 45% to about 55% during the painting of a workpiece and between about 20% and about 45% during the curing of the workpiece.

* * * * *

UNITED STATES PATENT AND TRADEMARK OFFICE
CERTIFICATE OF CORRECTION

PATENT NO. : 5,728,185

DATED : March 17, 1998

INVENTOR(S) : LeRoy H. Buchholz, Jr. and Loretta P. Buchholz

It is certified that error appears in the above-identified patent and that said Letters Patent is hereby corrected as shown below:

Column 3, line 44: "pro-set" should read --pre-set--.

Column 7, line 26: "off-powered" should read --oil-powered--.

Signed and Sealed this

Nineteenth Day of May, 1998

*Attest:*

BRUCE LEHMAN

*Attesting Officer*          *Commissioner of Patents and Trademarks*